United States Patent [19]

Jung et al.

[11] Patent Number: 5,133,918
[45] Date of Patent: Jul. 28, 1992

[54] PROCESS FOR MANUFACTURING A POLYCRYSTALLINE ALUMINA FIBER

[76] Inventors: Hyung J. Jung, 71-505, Hanyang Apt., Apgoojung-dong, Kangnam-ku, Seoul; Goo D. Kim, 9211, Kaist Apt., 39-1, Haweolkok-dong Seongbuk-ku, Seoul; No G. Park, 9-2, 9-Bunji, Dowon-dong, Yongsan-ku, Seoul, all of Rep. of Korea

[21] Appl. No.: 540,449
[22] Filed: Jun. 18, 1990

Related U.S. Application Data

[63] Continuation of Ser. No. 291,587, Dec. 29, 1988, abandoned.

[30] Foreign Application Priority Data

Jul. 20, 1988 [KR] Rep. of Korea ............... 88-9032[U]

[51] Int. Cl.⁵ .......................... D01F 6/96; D01F 9/08
[52] U.S. Cl. .............................. 264/211.11; 423/600; 501/153
[58] Field of Search ............... 264/211.11, 8, 13, 14, 264/DIG. 19; 423/600; 501/153; 425/8

[56] References Cited

U.S. PATENT DOCUMENTS 4,610,866 9/1986 Debsikdar et al. ................. 501/153

Primary Examiner—Hubert C. Lorin
Attorney, Agent, or Firm—Birch, Stewart, Kolasch & Birch

[57] ABSTRACT

An improved process for manufacturing a polycrystalline alumina fiber comprising dissolving aluminum alkoxide in alcohol, adding acetylacetone, hydrolyzing with water, and polymerizing to form a polymeric alumina sol and spinning the polymeric alumina sol by using a spinning apparatus.

7 Claims, 5 Drawing Sheets a) 524X b) 1350X

PROCESS FOR MANUFACTURING A POLYCRYSTALLINE ALUMINA FIBER

This application is a continuation of application Ser. No. 291,587, filed on Dec. 29, 1988, now abandoned.

BACKGROUND OF THE INVENTION

1. Field of the Invention

The present invention relates to a process for manufacturing a polymeric alumina sol in a non-aqueous solution and a process for manufacturing a polycrystalline alumina fiber from the polymeric alumina sol. The alumina sol has a high viscosity and an excellent spinning properties for manufacturing an inorganic alumina fiber and use for coating and binder materials when compared to a colloidal sol in a aqueous solution.

2. Description of the Prior Art

There are many types of known polymeric alumina sols. Such polymeric alumina sols have a low viscosity colloidal state so that such polymeric alumina sols do not exhibit an optimum viscosity and workability for spinning. Therefore, such alumina sols require the addition of soluble high polymers such as a polyethylene oxide for spinning.

SUMMARY OF THE INVENTION

Accordingly, it is an object of the present invention to provide an improved process for manufacturing a polymeric alumina sol in a non-aqueous solution.

Another object of the present invention is to provide an improved process for manufacturing a polycrystalline alumina fiber from a polymeric alumina sol.

A further object of the present invention is to provide a polymeric alumina sol having a chain structure with a high viscosity so as to allow for the manufacture of polycrystalline alumina fiber without requiring the addition of soluble high polymers such as polyethylene oxide.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an improved process for manufacturing a polymeric alumina sol comprising dissolving aluminum alkoxide in alcohol, adding acetylacetone, hydrolyzing with water, and polymerizing with a strong acid, and a process for manufacturing a polycrystalline alumina fiber comprising spinning the polymeric alumina sol by using a spinning apparatus.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
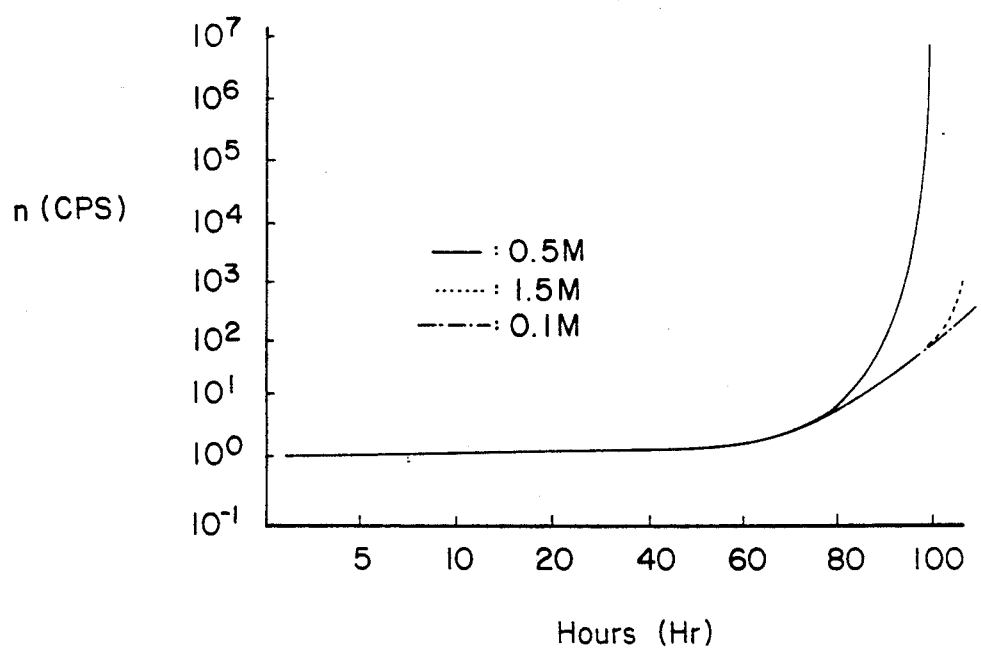
FIG. 1 shows the change of viscosity of the polymeric alumina sol over time varying with the time varying the amount of acetylacetone (0.1 mol–1.5 mol) according to the present invention.

According to a preferred embodiment of the present invention, there is provided a process for making a polymeric alumina sol in a non-aqueous solution a described below.

In the present invention, an aluminum alkoxide as a starting material are dissolved in alcohol and reacted with acetylacetone for making a stable bond. The reacted product is hydrolyzed with water and then polymerized with a strong acid for making a stable polymeric alumina sol.

The first acetylacetone reaction scheme according to the present invention is as follows:

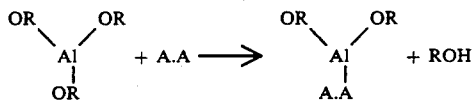

wherein A.A is acetylacetone, and
R is sec-butyl or iso-propyl ligand.

The aluminum sec-butoxide or aluminum iso-propoxide used as an aluminum alkoxide in the present invention is to be made into a transparent sol. The kinds of alcohol used in the present invention are iso-propanol or sec-butanol which may be used suitably to make the transparent sol with of the alkoxides. The amount of alcohol used does not affect the reaction greatly, but if it is too much, the separation of alcohol from the end product of the reaction is difficult. If it is too small, precipitation occurs. Therefore, 3–6 moles of iso-propanol is optimum amount of alcohol for about 1 mole of aluminum sec-butoxide, and 7–10 moles of iso-propanol is an optimum amount of alcohol for about 1 mole of aluminum iso-propoxide. The amount of acetylacetone is an important factor for the reaction and the maximum amount is about 1 mole of the alkoxide is about 0.4 to 1.5 mole of acetylacetone. More than this amount causes aluminum acetyl acetonate precipitation according to the following reaction:

The second hydrolysis reaction scheme according to the present invention is as follows:

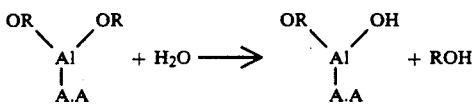

In this equation, the —OR substituent is converted with $H_2O$ to —OH, and a by-product alcohol ROH is also produced.

The reaction also varies with the amount of water and if the water is in excess, it is difficult to make a transparent sol because of rapid gellation. Even if the water is deficient, rapid gellation occurs. Therefore, 0.25–1.25 moles is an optimum amount for about 1 mole of the alkoxide.

The third polymerization reaction scheme according to the present invention is as follows:

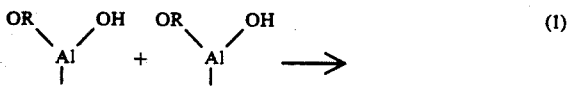

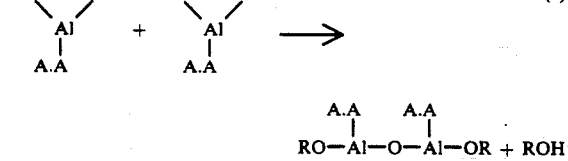

In the third reaction, the polymeric alumina sol is manufactured by adding a strong acid such as hydrochloric acid, sulfuric acid, or nitric acid.

The above equation (1) is an ideal polymerization reaction and equation (2) is a polymerization reaction from a unhydrolyzed sol. In equation (1), OR with water converts to OH and forms ROH. In a reaction, the strong acid is suitable for catalysis. If it is too much, rapid gellation occurs. If it is too small, the reaction time increases even though the polymeric reaction occurs. The strong acid catalyzes and accelerates the reaction. The amount of acid for about the 1 mole of alkoxide is about 0.0005 to 1.5 mole in the case of hydrochloric acid. After polymerization, alumina polymeric sol can be formed as follows:

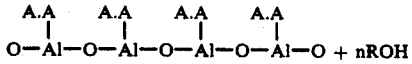

After drying the above polymeric sol for 100 hours at 80°–90° C., pH changes from 7.8 to 13.3 and the viscosity changes from 10 cps to $10^8$ cps. Therefore, an inorganic fiber is to be spun by using a spinning apparatus illustrated FIG. 4. The optimum viscosity for fiber spinning is about $10^5$–$10^7$ cps.

Figure 4:
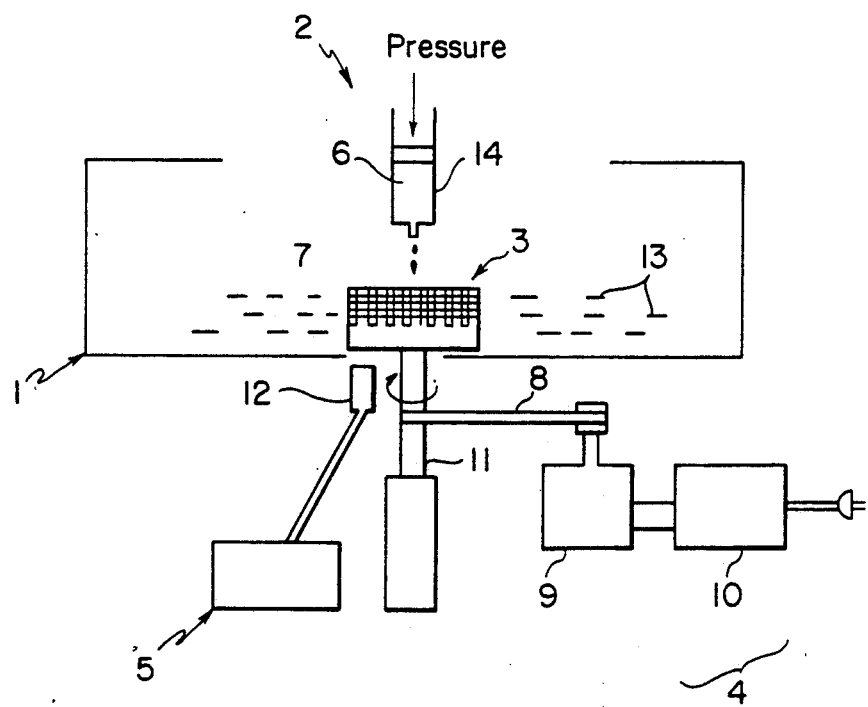
FIG. 4 diagrammatically shows a spinning apparatus for manufacturing a polycrystalline alumina fiber according to the present invention.

Referring now in detail to the drawings for the purpose of illustrating preferred embodiments of the present invention, a centrifugal spinning apparatus as shown in FIG. 4 comprises a main body 1, a press member 2 disposed in the main body 2, a cylinder 3 disposed in the inside of the main body 3, a spinning member 4 for rotating the cylinder 3, a heater 5 for heating the cylinder 3, and a sol reservoir tank 14. The main body 1 has a hollow sphere configuration. The pressure member 2 is operated by an outside pressure manner (not shown).

The polymeric alumina sol 6 disposed in the sol reservoir tank 14 is constantly dropped into the cylinder 3. The cylinder 3 covered with a sieve 7 disposed at the outside thereof is installed in a rotating axis 11. A motor 9 and a speed controller 10 control the speed of the cylinder 3 through a rotating belt 8. The heater 5 adjacent to the cylinder 3 controls the temperature of the cylinder 3. The cylinder 3 disposed in the inside of the main body 1 rotates with constant speed through the speed controller 10 and a certain temperature is maintained with the heater 5. The sol 6 is dropped into the cylinder 3 with a constant viscosity by using the pressure member 2 which is operated by the outside pressure manner. The dropped sol 6 is spun through the sieve and short fiber 13 are continuously manufactured.

The present invention will now be described in more detail in connection with the following examples which should be considered as being exemplary and not limiting the present invention.

EXAMPLE (1)

After introducing 4 mole of iso-propanol in a 3 neck flask at the room temperature, 1 mole of aluminum sec-butoxide is dropped slowly. During 6–7 minutes, the solution becomes an opaque sol and 0.5 mole of acetylacetone is added by using a pipet to make a clear sol in a stirrer. It takes about two hours to complete the acetylacetone reaction and then 1 mole of water is added. At this time, the color of the sol changes colorless or still the transparent color remains. For complete hydrolysis, the sol is agitated for 1 hour, and then 0.0015 mole of hydrochloric acid is added.

The following Tables 1 and 2 show the pH and viscosity of the sol about the time period at the temperature of 80° C. in a dryer, respectively.

TABLE 1

| Hour | 0 | 2 | 4 | 6 | 14 | 15 | 100 |
|---|---|---|---|---|---|---|---|
| pH | 7.8 | 9.5 | 12.2 | 12 | 13.1 | 13.2 | 13.3 |

TABLE 2

| Hour | 0 | 60 | 80 | 90 | 95 | 100 |
|---|---|---|---|---|---|---|
| Viscosity (cps) | $2 \times 10^0$ | $2 \times 10^0$ | $1 \times 10^1$ | $1 \times 10^2$ | $1 \times 10^3$ | $1 \times 10^8$ |

It is confirmed that the product produced by sintering the sol at the temperature of about 1100° C. is substantially $\alpha$—$Al_2O_3$.

EXAMPLE OF EXPERIMENT

Figure 2:
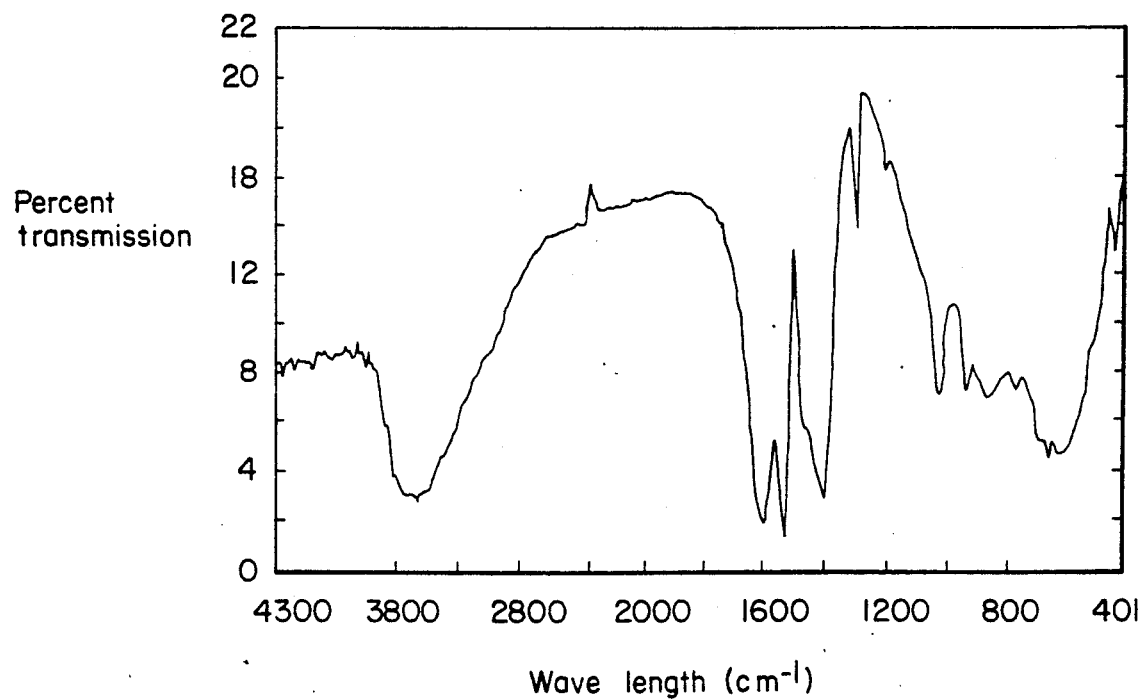
FIG. 2 shows the FT-IR analysis of the alumina sol (Example 1) according to the present invention.
Figure 3:
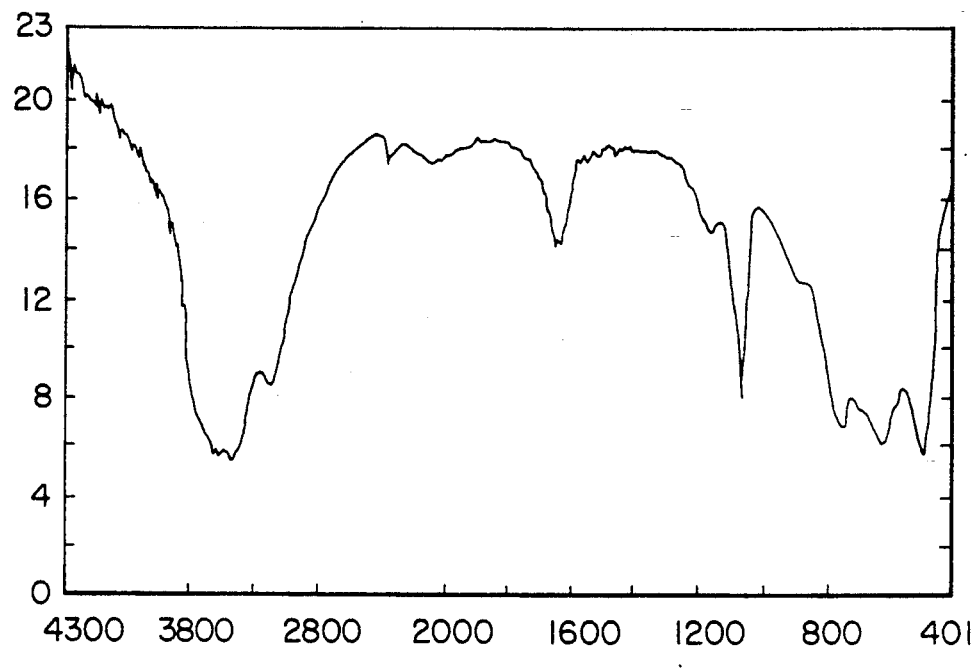
FIG. 3 shows the FT-IR analysis of the alumina sol (aqueous method)

FIG. 1 shows a change of the viscosity of the alumina sol with time varying the amount of acetylacetone from 0.1 mole to 1.5 mole. As shown in FIG. 1, the viscosity does not exceed $10^2$ cps when 0.1 mole and 1.5 mole of acetylacetone is added. However, addition of 0.5 mole of acetylacetone as shown in Example 1 shows excellent spinnerbility with more than $10^8$ cps of viscosity. FIG. 2 shows a FT-IR analysis of the alumina sol using experiment 1. FIG. 3 shows a FT-IR analysis of the alumina sol using aqueous method FIGS. 2 and 3 show the difference in structure of the alumina sol between the conventional aluminal sol and the aluminal sol in the present invention. FIG. 2 shows the polymeric aluminal sol in the present invention and illustrates to vary the viscosity without adding any additives. Therefore, the polymeric alumina sol can be used to make a high purity alumina fiber and to apply composite and coating materials.

EXAMPLE 2

The alumina sol in Example 1, dried for 97 hour at 80° C. so as to obtain $10^6$ cps of viscosity, is introduced in the sol reservoir 14 as shown in FIG. 4. The cylinder 3 disposed in the main body 1 is rotated to 3000 rpm by using the spinning member 4 and is heated to 450° C. by using the heater 5.

The alumina sol 6 in the sol reservoir tank 14 is dropped into the cylinder 3 with 5 ml/sec using the pressure member 2, then the alumina sol in the cylinder 3 is spun through the sieve 8 having 495 μ of its diameter for manufacturing the short fiber.

Figure 5:
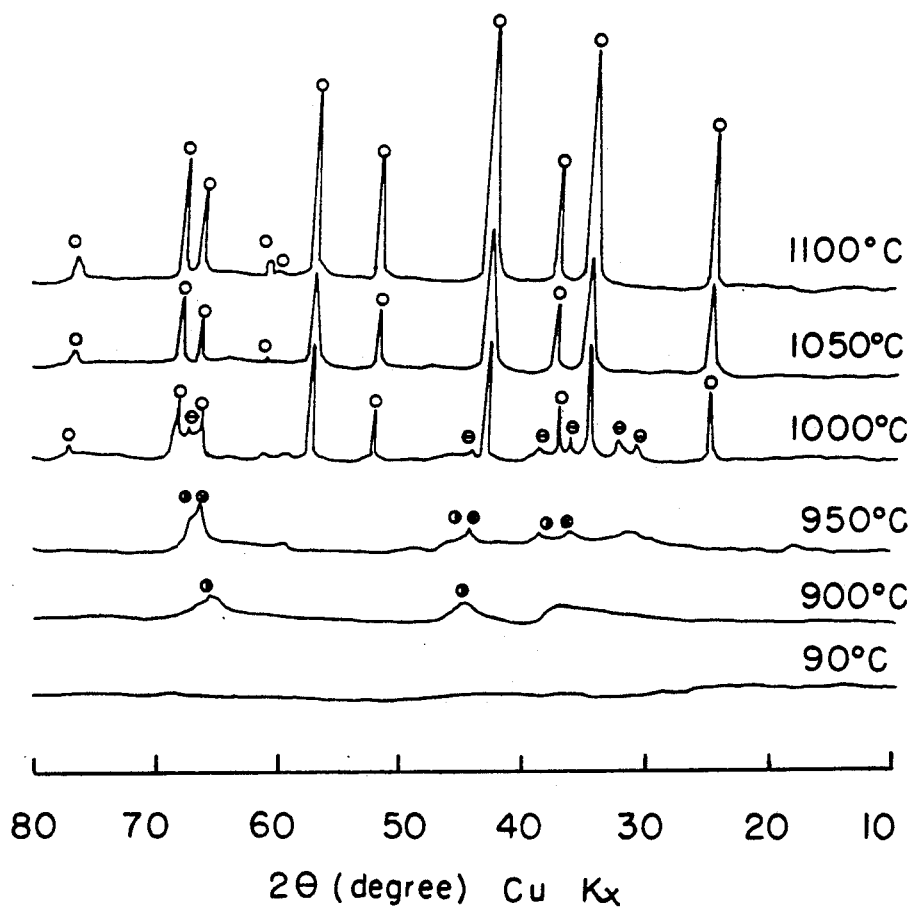
FIG. 5 shows the X-ray analysis of the polycrystalline alumina fiber according to the present invention.
Figure 6A:
FIG. 6(A) shows the electron micrograph (524×) of the fiber according to the present invention.
Figure 6B:
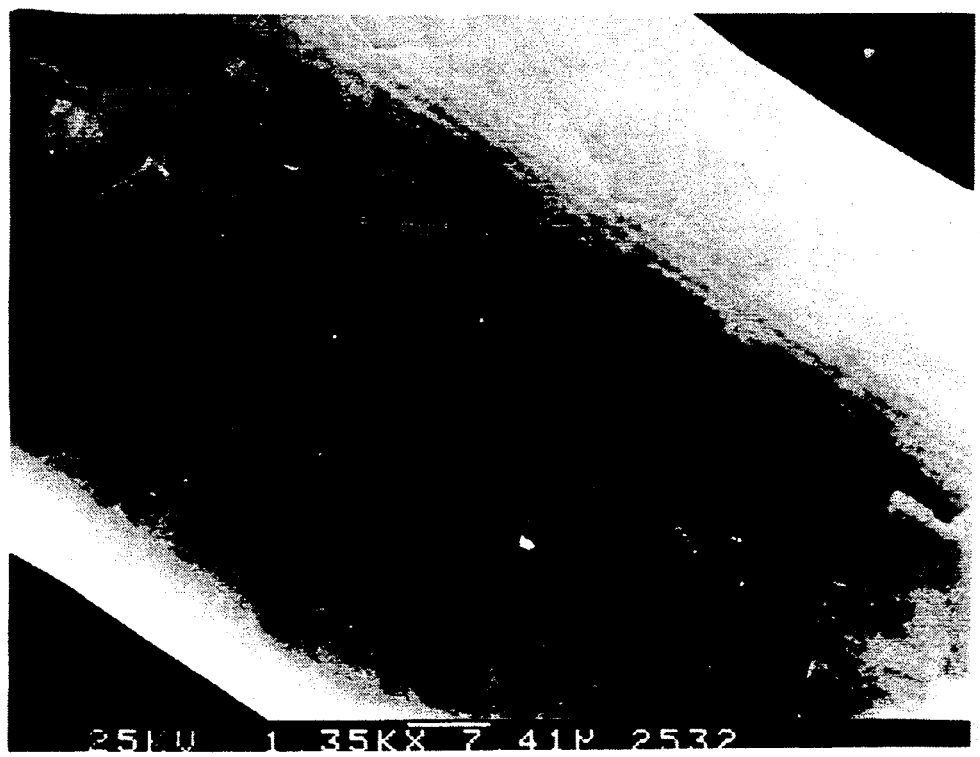
FIG. 6(B) shows the electron micrograph (1350×) of the fiber according to the present invention.

FIG. 5 shows a X-ray analysis of the fiber with the heat treatment. Below 900° C., an amporphous state is a main phase. At 900° C., $\gamma$-$Al_2O_3$ appears. At 950° C., $\sigma$-$Al_2O_3$ partially appears. At 1000° C., $\alpha$-$Al_2O_3$ and $\theta$-$Al_2O_3$ appears. Above 1050° C., $\alpha$-$Al_2O_3$ is a main phase of the alumina sol. FIG. 6 shows an electron micrograph of the polycrystalline alumina fiber. The diameter of the fiber is about 70 μm.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A process for manufacturing a polycrystalline alumina fiber which comprises the steps of:
    (a) dissolving 1 mole of aluminum alkoxide in 3-10 moles of alcohol to form an aluminum solution,
    (b) adding about 0.5 moles of acetylacetone to the aluminum solution,
    (c) hydrolyzing the obtained product f step (b) with 0.25-1.25 moles of water,
    (d) polymerizing the obtained product of step (c) with 0.0005-1.3 mole of a strong acid to produce a polymeric alumina sol,
    (e) drying the polymeric alumina sol in a dry oven at 80°-90° C., and
    (f) spinning the dried sol using a spinning apparatus so as to obtain a viscosity of $10^5$-$10^7$ cps.

2. The process of claim 1, wherein the aluminum alkoxide is aluminum sec-butoxide.

3. The process of claim 1, wherein the aluminum alkoxide is aluminum iso-propoxide.

4. The process of claim 1, wherein the strong acid is hydrochloric acid.

5. The process of claim 1, wherein said aluminum oxide in step (a) is aluminum sec-butoxide which is dissolved in 3-6 moles of iso-propanol.

6. The process of claim 1, wherein said aluminum oxide is step (a) is aluminum iso-propoxide is dissolved in 7-10 moles of iso-propanol.

7. The process of claim 1, wherein said strong acid is selected from the group consisting of hydrochloric acid, sulfuric acid and nitric acid.

* * * * *